Nov. 7, 1967   A. MEYLAN ET AL   3,350,768
DEVICE FOR FITTING TOGETHER TWO PIECES
Filed Jan. 10, 1966

INVENTOR
André Meylan and Hans Haidegger
BY
ATTORNEY

United States Patent Office 3,350,768
Patented Nov. 7, 1967

3,350,768
DEVICE FOR FITTING TOGETHER TWO PIECES
André Meylan, Moutier, and Hans Haidegger, Solothurn, Switzerland, assignors to Felsa S.A., Grenchen, Switzerland
Filed Jan. 10, 1966, Ser. No. 519,506
Claims priority, application Switzerland, Feb. 5, 1965, 1,608/65
4 Claims. (Cl. 29—271)

ABSTRACT OF THE DISCLOSURE

A pair of work pieces with recesses therein are maintained in alignment by a ball fitting into the recesses.

The present invention relates to a device for assembling or fitting together two pieces, guaranteeing the exact position and the exact orientation of one of said pieces with respect to the other. This device may be used for instance in watch-making for assembling the component parts such as pillar plates, bridges, balance cocks, pallet cocks, stem cocks of the frame of a watch movement, but may also be used generally for any kind of apparatus.

Up to now, for positioning and orienting a piece with respect to another, cylindrical reference members (pillars, feet, pins) were generally used, by means of which the required position of said piece was guaranteed. Such assemblies may be satisfactory if the fitting surfaces are established and rectified with the required precision and care, but these operations are difficult and expensive.

The present invention aims at overcoming these drawbacks. It relates to a device for assembling or fitting together two pieces, said device including at least one ball a portion of which engages without side-play a recess of one of the pieces, the other portion of said ball engaging without side-play a recess of the other piece, so as to render both recesses coaxial with each other.

The accompanying drawing illustrates, by way of example, three embodiments of the invention.

Figure 1:
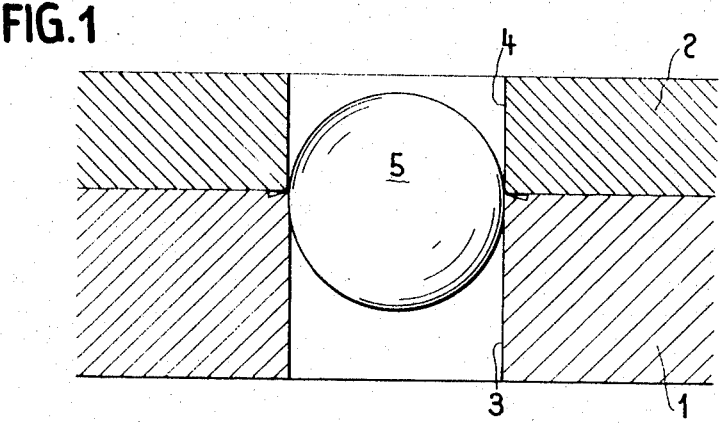
Figure 2:
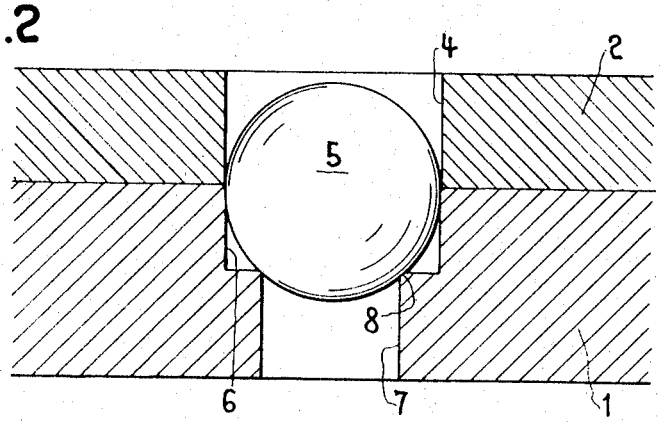
Figure 3:
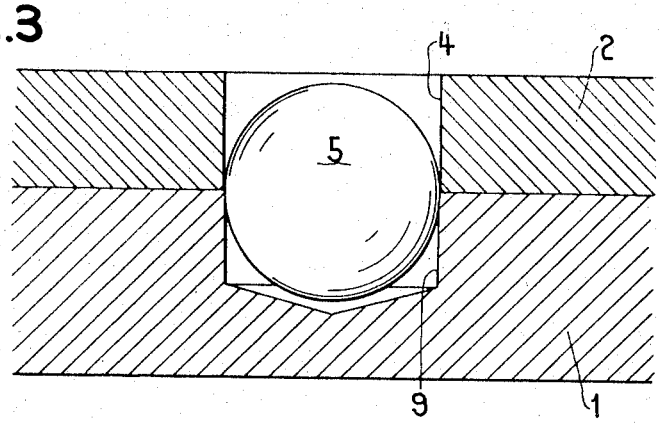

FIGURES 1, 2 and 3 represent in axial section these three embodiments, respectively.

FIGURE 1 shows the two pieces to be assembled with each other, which are denoted by the reference numerals 1 and 2, respectively. The piece 1 is for instance a pillar plate of a watch and the piece 2 a bridge. In the piece 1 is made a recess 3, consisting in the present case of a cylindrical bore. Similarly, in the piece 2 there is provided a recess 4, consisting here of a cylindrical bore having the same diameter as the bore 3. A ball 5 of the same diameter as the bores 3 and 4 is secured by setting it or by caulking it in the bore 3 in such a manner that some more than its half engages said bore 3. The remaining portion of the ball 5, which projects outside the bore 3, fits without side-play into the bore 4 of the piece 2. The piece 2 is thus perfectly guided by the projection of the ball 5, so that both bores 3 and 4 are rendered coaxial with each other.

In the second embodiment (FIGURE 2), both pieces 1 and 2 are again present. The recess made in the piece 1 consists here of a stepped bore including a portion 6 having the same diameter as the ball 5, followed by a portion 7 of less diameter. As in the first embodiment, some more than the half of the ball 5 engages the bore 6, 7. The ball 5 rests over a small circle on the edge 8 of the bore 7 and is welded to the piece 1 in the recess 6, 7. Welding may be carried out between the ball 5 and the bore 6, or between the ball 5 and the edge 8 or in both places.

The third embodiment (FIGURE 3) differs from the preceding one in that the recess made in the piece 1 consists of a blind hole 9 of the same diameter as the ball 5. The ball 5 is cemented or mounted with friction fit in the hole 9.

In a modified embodiment (not shown), the ball might be simply driven into the recess of the piece 1. In the case wherein both recesses consist of blind holes of the same diameter as the ball, it is not necessary to provide fixing means for the ball.

While certain representative embodiments and details have been shown for the purpose of illustrating the invention, it will be apparent to those skilled in the art that various changes and modifications may be made therein without departing from the spirit or scope of the invention.

What we claim is:
1. In combination with two work pieces, a device for fitting the work pieces together in alignment, the work pieces having recesses on at least facing surfaces, said device being a ball, a portion of which engages without side-play a recess of one of the pieces, the other portion of said ball engaging without side-play a recess of the other piece, so as to render both recesses coaxial with each other.

2. A device as claimed in claim 1, wherein the ball engages the recess of one of the pieces so that about one half of the ball projects outside said recess.

3. A device as claimed in claim 1, wherein the ball is set in the recess of one of the pieces.

4. A device as claimed in claim 1, wherein the ball is mounted with friction fit in the recess of one of the pieces.

References Cited

UNITED STATES PATENTS

| | | | |
|---|---|---|---|
| 1,453,913 | 5/1923 | Burdick | 29—271 X |
| 1,481,836 | 1/1924 | Hammerl | 29—453 X |
| 1,743,492 | 1/1930 | Sise | 29—525 X |
| 1,993,595 | 3/1935 | Cramer | 29—525 X |
| 2,275,900 | 3/1942 | Hall | 29—453 X |
| 2,506,765 | 5/1950 | Bach | 29—525 X |

WILLIAM FELDMAN, *Primary Examiner.*

J. C. PETERS, *Assistant Examiner.*